Sept. 28, 1954   E. R. GAUL II, ET AL   2,690,475
SYNCHRONOUS TELETYPEWRITER MIXER
Filed April 17, 1953   8 Sheets-Sheet 7
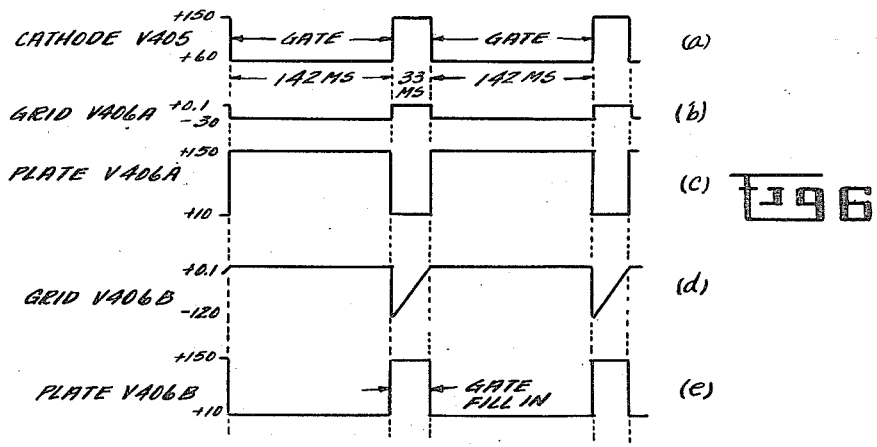
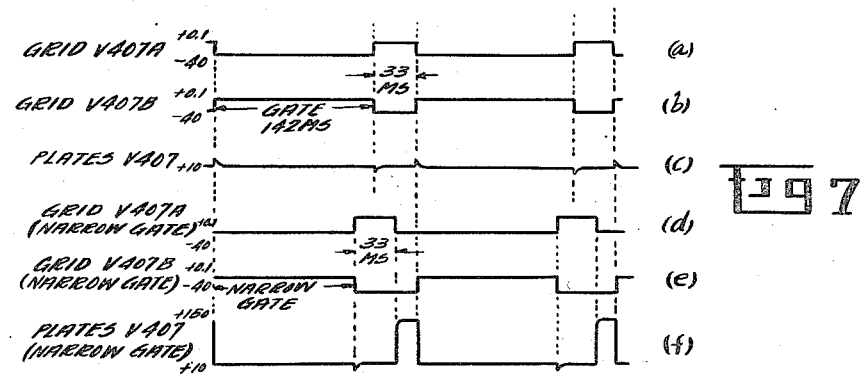
INVENTORS.
LEIGH A. BRITE
EDWARD R. GAUL, II
BY James S. Shannon
AGENT—
Wade Loouty
ATTORNEY—

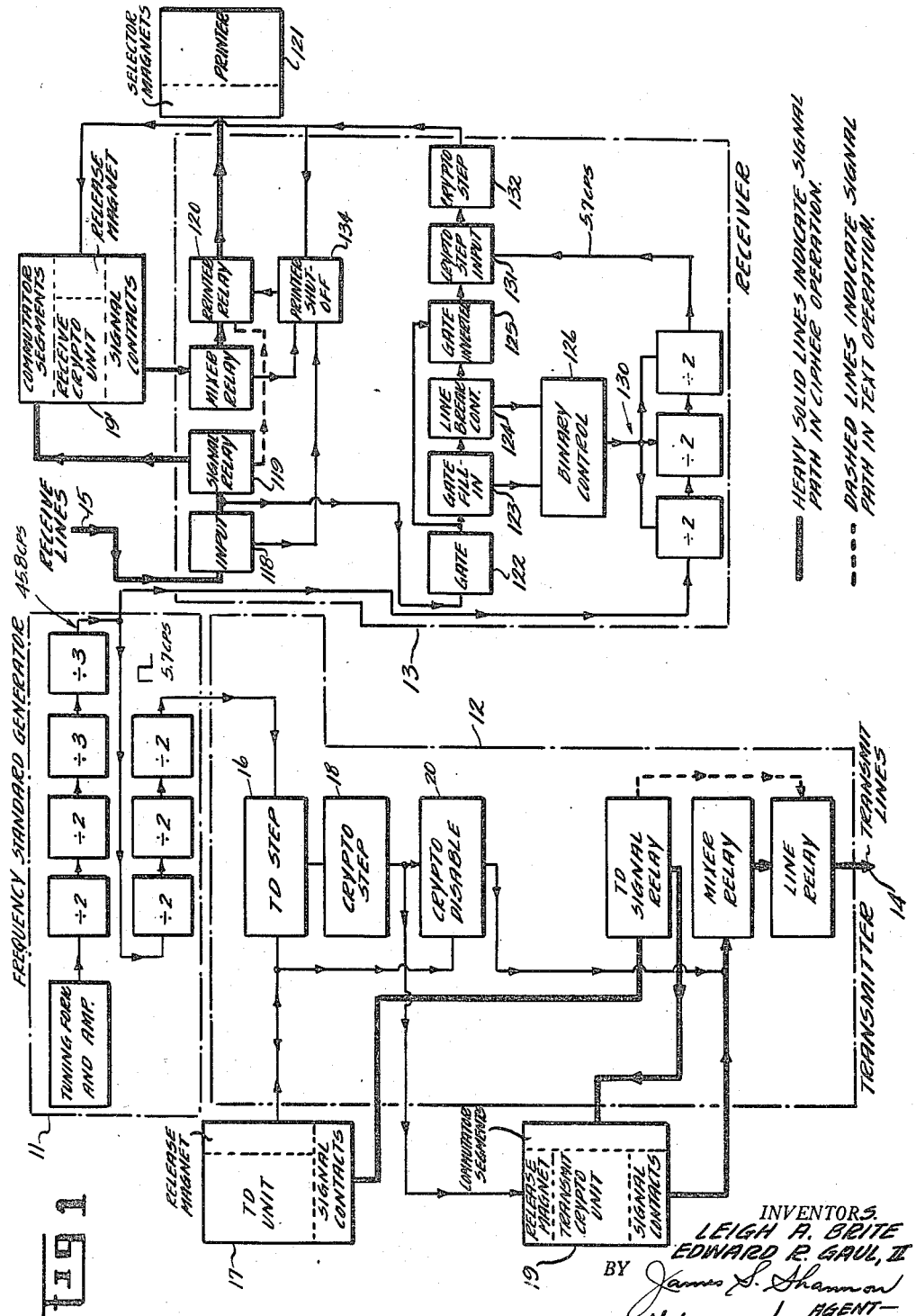

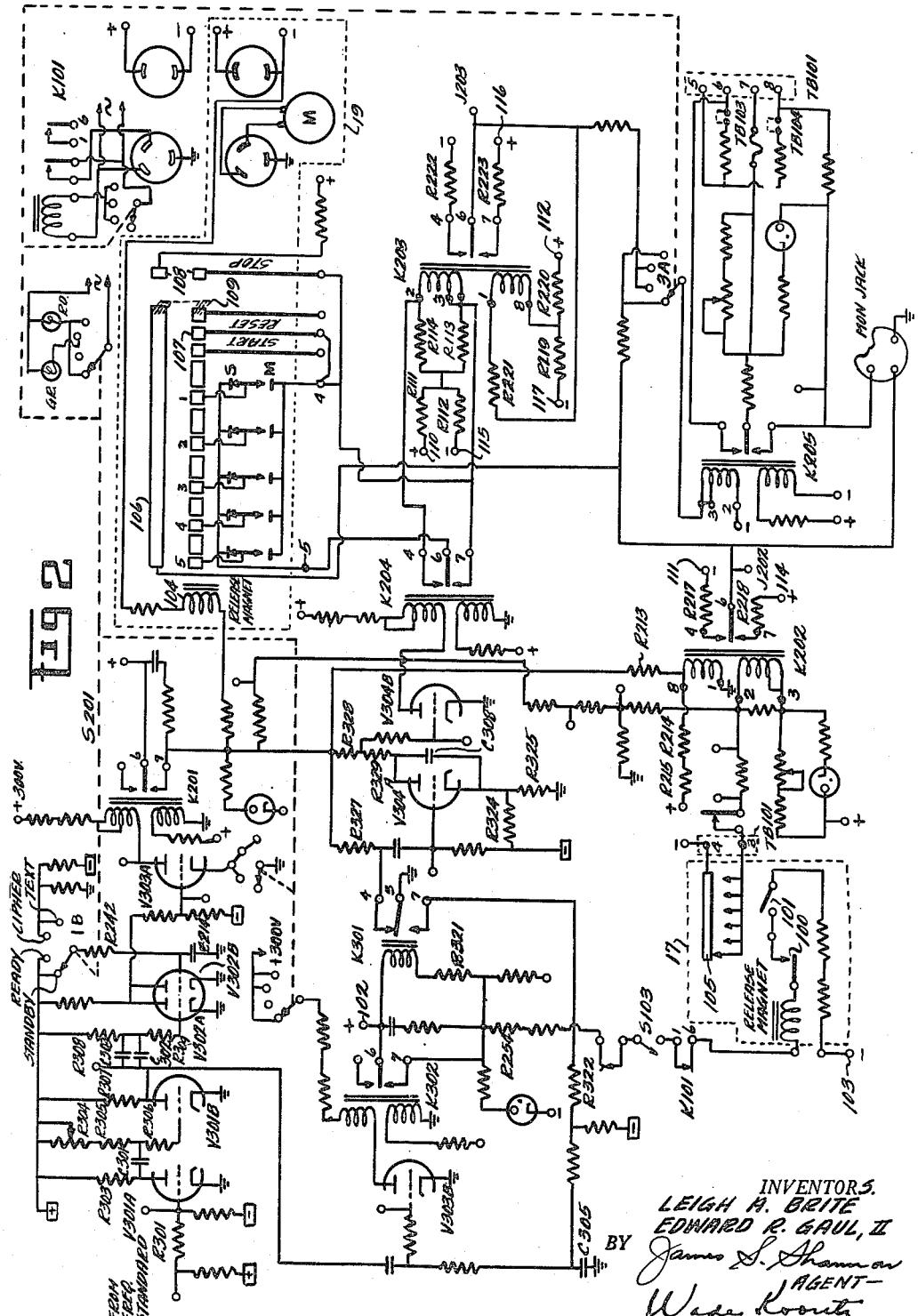

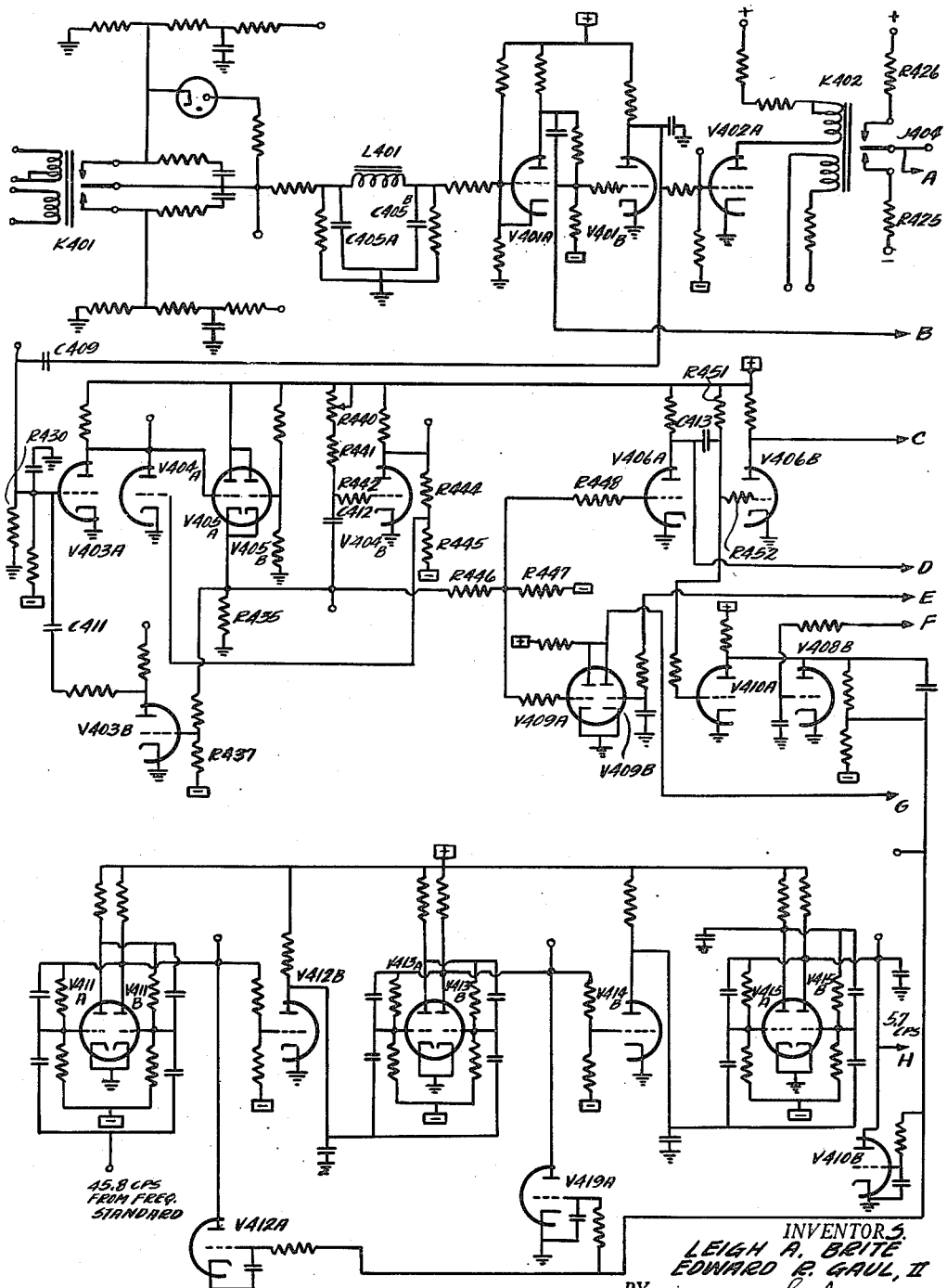

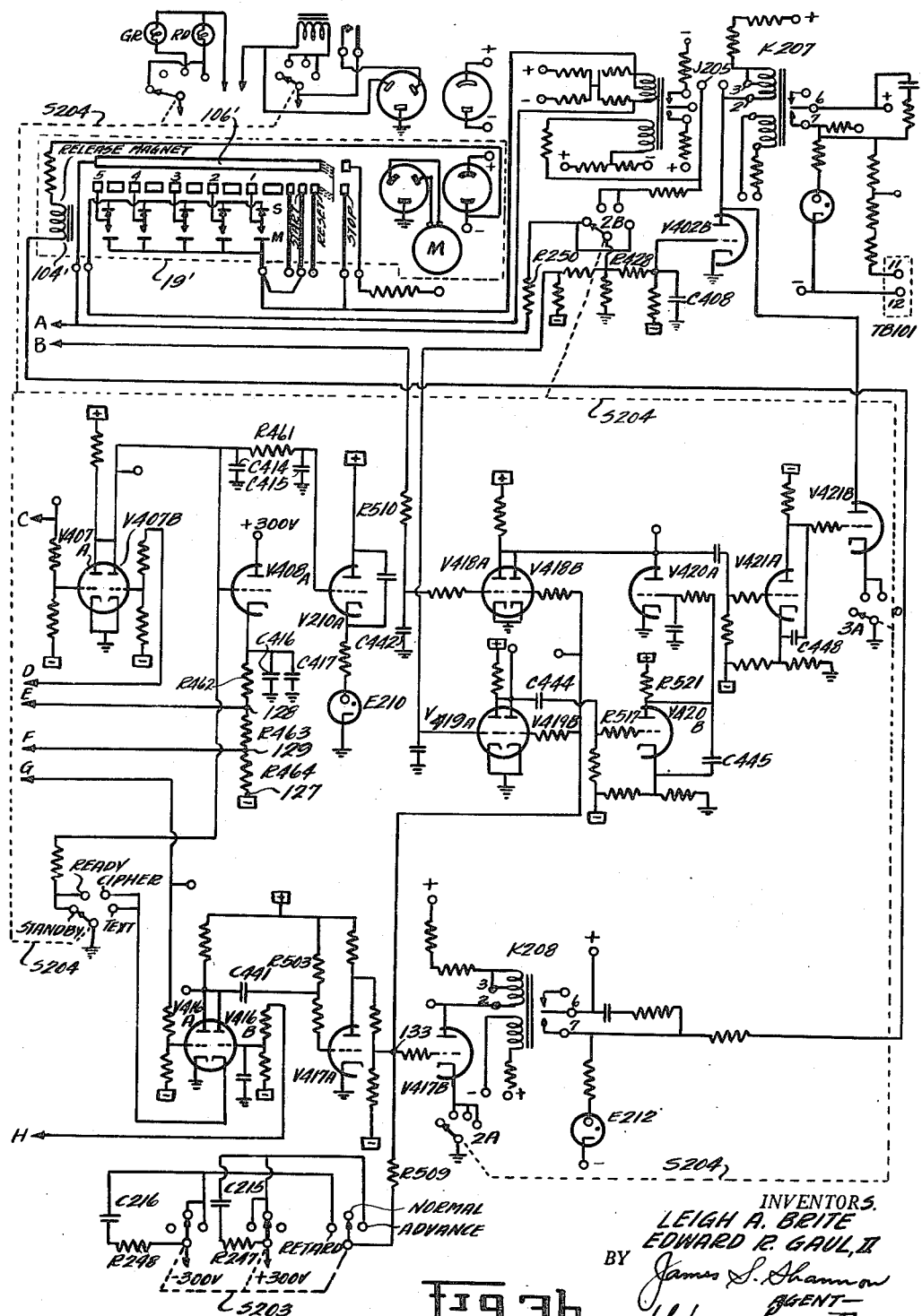

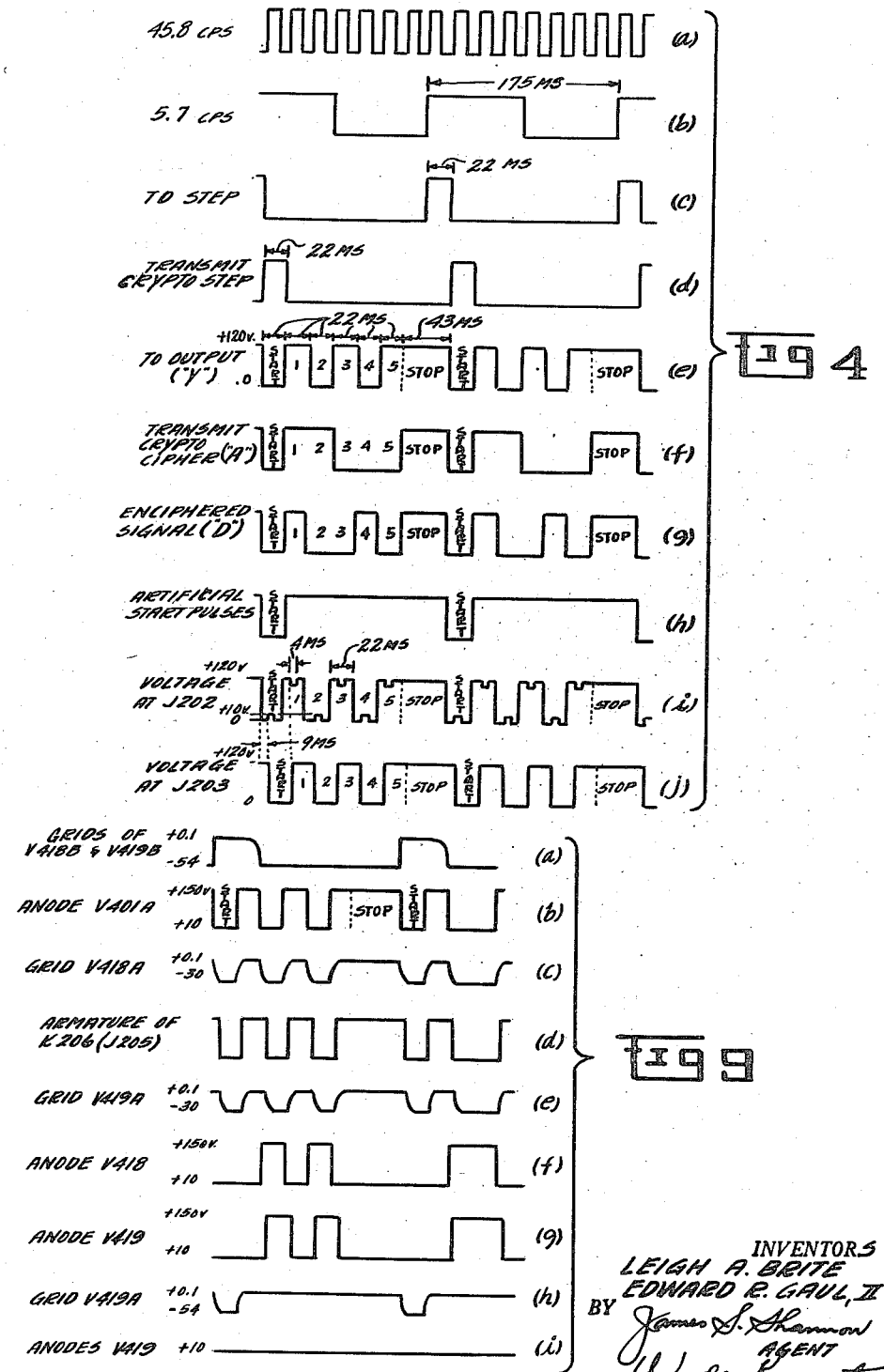

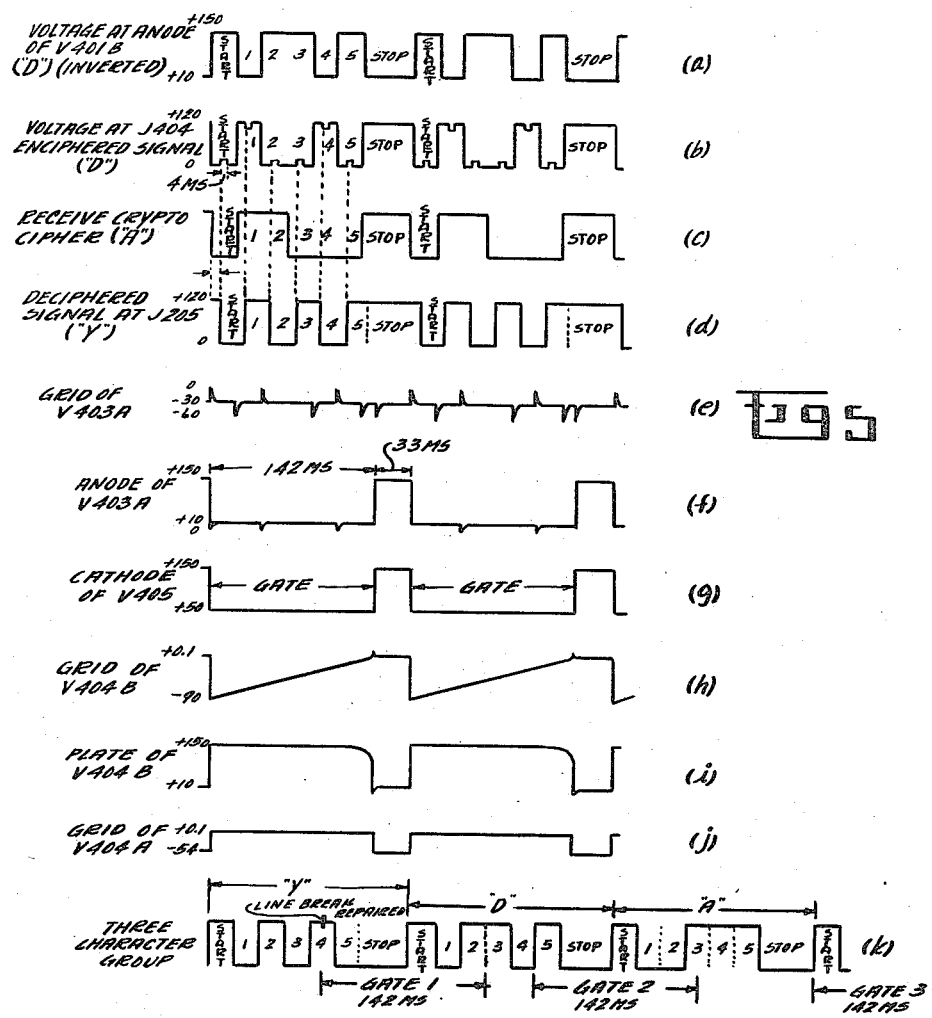

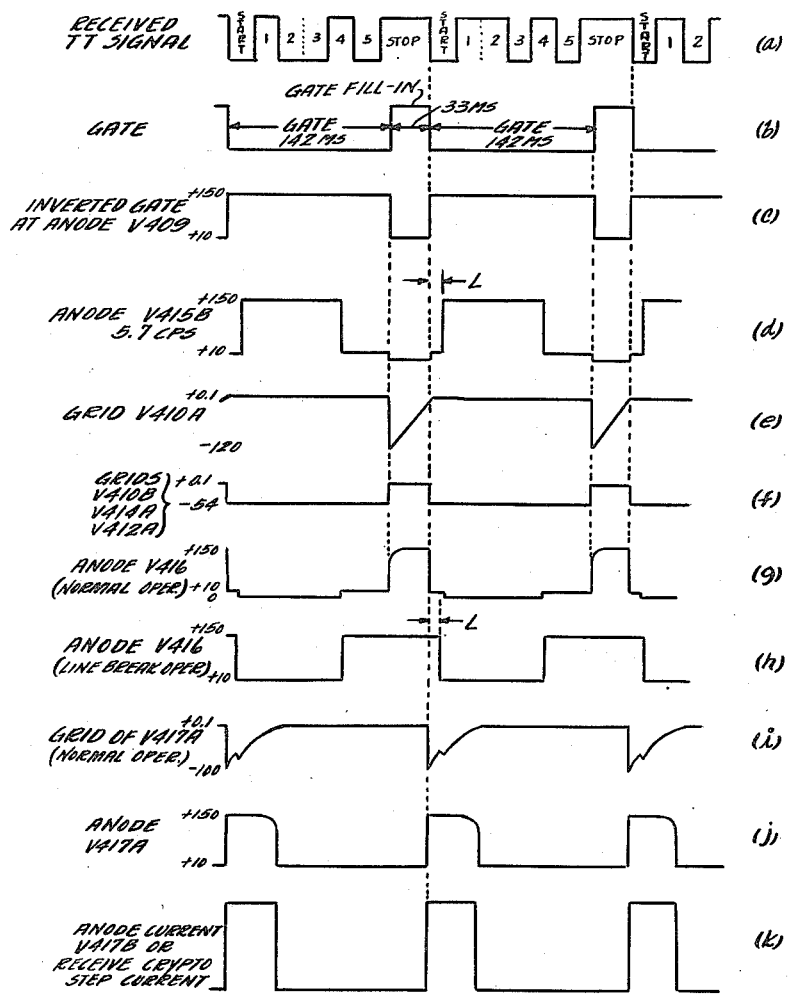

Patented Sept. 28, 1954

2,690,475

UNITED STATES PATENT OFFICE 2,690,475

SYNCHRONOUS TELETYPEWRITER MIXER

Edward R. Gaul II, San Antonio, Calif., and Leigh A. Brite, Kent, Ohio

Application April 17, 1953, Serial No. 349,580

7 Claims. (Cl. 178—22)

(Granted under Title 35, U. S. Code (1952), sec. 266)

The invention described herein may be manufactured and used by or for the United States Government for governmental purposes without payment to us of any royalty thereon.

This invention relates to teletypewriter systems and particularly to such systems employing on-line enciphering and deciphering of the transmitted message.

In conventional cryptographic teletypewriter systems the transmission of a message originates with the transmitter-distributor unit. This unit generates a series of teletypewriter signals by the passage of a tape therethrough which has previously been punched in accordance with the message. Each teletypewriter signal or character group represents a character in the message and consists of a combination of seven sequentially occurring pulses, each pulse being one of two possible distinguishable types termed "mark" and "space." The first pulse of a character group is designated the start pulse and is always a space. The last pulse of the group is designated the stop pulse and is always a mark. The five intermediate pulses occur in various combinations of mark and space and may represent any of the thirty-two characters of the standard teletypewriter keyboard.

The clear text character groups from the transmitter-distributor are applied to the transmit cryptographic unit which converts each group into an enciphered character group. The transmit cryptographic unit accomplishes this by mixing the five character pulses of each text group with five character pulses representing a cipher group. The cipher groups, like the text groups in the transmitter-distributor unit, are recorded on a punched tape which passes through the transmit cryptographic unit in synchronism with the tape in the transmitter-distributor unit. The mixing process follows the rule of signs in algebraic multiplication, considering a mark positive (+) and a space negative (−), so that

M×M=M
M×S=S
S×S=M

The following is a specific example of the enciphering process at the transmitter:

| S | M | S | M | S | M | M | text character group "Y" |
|---|---|---|---|---|---|---|---|
|   | M | M | S | S | S |   | cipher character "A" |
| S | M | S | S | M | S | M | transmitted enciphered group "D" |

Only the five character representing pulses are involved in the process, the start pulse (space) and stop pulse (mark) that complete a character group remain unchanged. The characters forming the cipher groups on the cipher tape may, of course, comprise any number of the thirty-two standard characters arranged in any desired sequence.

The enciphered teletypewriter signal obtained as above may be transmitted over any suitable transmission link to the receiving station. At the receiving station the enciphered teletypewriter signal is applied to a receive cryptographic unit which is supplied with a cipher tape identical to that of the transmit cryptographic unit. A mixing process between the received enciphered character groups and the locally supplied cipher groups takes place in the receive cryptographic unit. This process is the same as the mixing process at the transmitter and results in each enciphered character group being converted into the original text character group. The following is a specific example of the deciphering process at the receiver:

| S | M | S | S | M | S | M | received enciphered group "D" |
|---|---|---|---|---|---|---|---|
|   | M | M | S | S | S |   | cipher character group "A" |
| S | M | S | M | S | M | M | text character "Y" |

The deciphered character groups obtained from the receive crypto unit may be applied to a teletypewriter printer for reproduction of the clear text.

It is clear that in the above system the receive cryptographic unit must always be maintained in step with the transmitter-distributor and transmit crypto units, for otherwise each enciphered character group arriving at the receive cryptographic unit would be mixed with a cipher group different from the cipher group used at the transmit cryptographic unit which would result in a decoding error. Conventional systems have relied upon the start pulse of each character group to maintain synchronization between the TD unit and the transmit and receive cryptographic units in addition to its usual function of synchronizing the printer. This method has the disadvantage that failure of the transmission link only to the extent of losing a single start pulse causes the receive cryptographic unit to fall behind the transmit cryptographic unit by one step and results in a garbled output from that time, since the receive cryptographic unit has no way of regaining the lost step. Also, the generation of a false start pulse by a disturbance in the transmission link causes the receive cryptographic unit to advance one step ahead of the transmit cryptographic unit, which likewise results in a continuous decoding error from the time of the disturbance until the units can be resynchronized. Accordingly it is seen that conventional on-line cryptographic systems require a transmission link of exceedingly high quality for reliable operation.

It is therefore the principal object of this invention to provide a teletypewriter system employing on-line cryptographic equipment in which means are provided for maintaining synchronization between transmit and receive cryptographic units during periods of failure of the transmission link. Briefly, this is accomplished by providing identical frequency standards at both the transmit and receive stations. At the transmit station step pulses are derived from the frequency standard to control the operation of the transmitter-distributor and transmit cryptographic units. During periods of normal transmission the teletypewriter signal arriving at the receive station is used to synchronize the operation of the receive cryptographic unit with that of the transmit cryptographic unit and also to maintain synchronization between the receive frequency standard and the frequency standard at the transmit station. During periods of transmission link failure when there is no received teletypewriter signal the receive cryptographic unit nevertheless continues to be stepped in unison with the transmit cryptographic unit by means of step pulses derived from the receive frequency standard. The length of time during which synchronization may be maintained depends upon the natural frequency stability of the frequency standards, periods up to one-half hour or more being easily attainable. Upon restoration of the transmission link the received teletypewriter signal again takes over the function of stepping the receive cryptographic unit and also corrects any drift of the receive frequency standard relative to the transmit frequency standard that may have occurred during the break.

The details of a teletypewriter system employing the above described method of synchronization will be described in connection with the accompanying drawings, in which Fig. 1 is a block diagram of a teletypewriter station in accordance with the invention;

Fig. 2 is a schematic diagram of the transmitter portion of the teletypewriter station in Fig. 1;

Figs. 3a and 3b show a schematic diagram of the receiver portion of the teletypewriter station of Fig. 1; and Figs. 4–9 show waveforms appearing at various points in the teletypewriter station circuits.

In the following description "TT" will be used for teletypewriter, "TD" for transmitter-distributor, "crypto" for cryptographic and "line" for transmission link either land circuit or radio, in accordance with accepted practice in the art. Also the TD unit, the transmit and receive crypto units and the printer unit shown or indicated in the drawings are standard TT units and will not be described in any more detail than is necessary for an understanding of the invention. Detailed descriptions of these units are readily available in the technical literature on TT systems such, for example, as the Army Manual TM 11-680, Teletypewriter Circuits and Equipment, available from the Superintendent of Documents, Washington, D. C.

Fig. 1 shows a functional block diagram of a TT station incorporating the invention while Figs. 2, 3a and 3b show the circuit details of Fig. 1. The circuit which interconnects the standard TD, transmit crypto, receive crypto and printer units consists of three sections, namely, the frequency standard generator 11, the transmitter 12 and the receiver 13, as shown in Fig. 1. Outgoing cryptographic messages are sent over transmit lines 14 to a distant TT station and incoming cryptographic messages are received over receive lines 15 from the distant station. The cooperating distant TT station is identical to that shown in Fig. 1.

The frequency standard generator has two major functions. One is to supply 5.7 C. P. S. pulses to the transmitter for use in synchronizing the transmit crypto and TD units. The other is to supply 45.8 C. P. S. pulses to the receiver for use in synchronizing the receive crypto unit during a line break. The frequency standard generator may be of any suitable type having the required frequency stability and capable of producing square waves having frequencies of 45.8 C. P. S. and 5.7 C. P. S. as shown in Figs. 4(a) and (b). The generator shown comprises a tuning fork controlled master oscillator operating at 1650 C. P. S. and sufficient binary and ternary dividers to reduce this frequency to the above designated values.

The 5.7 C. P. S. square wave has a period of 175 ms. (milliseconds) which is equal to the time duration of the TT character group used in this system and shown in Fig. 4(e). This character group differs from the standard TT character group only in that the stop pulse is 12 ms. longer, thus increasing the total duration of the group to 175 ms. as compared to 163 ms. for the standard group. The reason for the longer stop pulse is as follows: In conventional TT systems the TD unit runs continuously until a complete message has been sent. In the present system, however, a timed pulse, derived from the frequency standard, starts the TD unit each time a character group is transmitted, the unit stopping at the end of each group. The extra time required for this intermittent operation is added to the last or stop pulse of the character group.

The principal purpose of the transmitter section 12 is to synchronize the operation of the TD and transmit crypto units. The transmitter section itself may be broken down into three sections, namely, the stepping section, the signal section and the disable section, each serving a different purpose. The stepping section provides pulses of approximately 22 ms. time duration at 175 ms. intervals to operate the release mechanisms of both the TD and transmit crypto units. The signal section generates and controls the information sent to the transmit lines. The disable section prevents transmission of the transmit crypto unit's cipher when there is no signal coming from the TD in order to maintain code security.

The TD step circuit 16 of Fig. 1 comprises tubes V301A, V301B, V303B, TD step relay K302 and bias control relay K301 of Fig. 2. The object of the TD step circuit is to produce a series of 22 ms. current pulses, as shown in Fig. 4(c), in the release magnet of TD unit 17. The leading edges of these pulses are coincident with the positive-going edges of the frequency standard square wave output shown at a, and each initiates a cycle of operation of the TD. The step pulses are generated as follows:

Tubes V301A and V301B normally conduct heavily due to the fact that the grid of each is normally slightly positive relative to its associated cathode. The 57 C. P. S. square wave, Fig. 4(b), from the frequency standard, is applied to the grid of tube V301A. The positive half-cycles of this wave cannot raise the potential of the grid appreciably due to the action of limiting resistor R301, however the negative half-cycles drive the tube into cut-off thus producing positive rectangular pulses on its anode. During these positive anode pulses condenser C301 charges, but the potential of the grid of tube V301B is prevented from rising appreciably in potential by the action of limiting resistor R306. At the negative-going edge of the positive pulse on the anode of tube 301A the anode potential drops sharply, allowing condenser C301 to discharge through resistors R303, R304 and R305 which lowers the potential of the grid of tube V301B far below cut-off and causes a sharp rise in its anode voltage. As condenser C301 discharges the potential of the grid of tube V301B rises toward cut-off at which point conduction in the tube is resumed and the anode potential drops. Since only a small increase in grid voltage above the cut-off valve is required to produce the normal heavy conduction in tube V301B the foregoing process produces a substantially rectangular positive voltage pulse at its anode. The length of the pulse is determined by the time constant of the discharge circuit of condenser C301 which may be varied by adjusting resistor R304. The circuit is normally adjusted to produce a pulse of about 22 ms.

The release magnet of TD17 has on-off switch S103, with contacts 1–6 of relay K101, end of tape switch 100 and tape stop switch 101 in series therewith. When a tape is in position in the TD unit and when the equipment is otherwise ready for cipher operation all of these switches are closed so that a circuit is completed from positive terminal 102 through the coil of relay K301, resistor R321, resistors R254 and R104, switch S103, contacts 1–6 of K101, the release magnet, and switches 100 and 101 to negative terminal 103. The current flow through this circuit is insufficient to operate the release magnet but does operate relay K301 to its lower contact. Tube V303B is normally biased beyond cut-off by the voltage across condenser C305. Operation of relay K301 grounds resistor R322 which allows condenser C305 to discharge and the voltage on the grid of tube V303B to rise. The time constant of the discharge circuit is made such as to require about two seconds for the grid potential to rise to an operative value after closure of the various switches in series with the TD release magnet.

The 22 ms. positive pulse on the anode of tube V301B is applied to the grid of tube V303B and, when this tube is biased to an operative point, causes a 22 ms. pulse of current to flow through the winding of TD step relay K302. Operation of this relay short circuits the winding of relay K301 and resistor R321 making a direct connection from positive terminal 102 to resistor R254. This removal of resistance from the TD release magnet circuit allows the current therein to rise above the value required to operate the release mechanism and initiate a cycle of operation of the TD. During the 22 ms. period relay K301 is deenergized and condenser C305 is free to recharge to its former higher voltage. However the 22 ms. interval is so short relative to the time constant of the condenser charging circuit that no appreciable change in voltage thereacross occurs, and the grid of tube V303B remains at its operative bias potential during transmission of a message.

The function of the crypto step circuit 18 is to generate a 22 ms. current pulse for stepping the transmit crypto unit. This pulse should lag the TD step pulse by 22 ms. as shown in Fig. 4(d). The crypto step circuit comprises pulse generator stage V302A, clamper stage V302B, relay driver stage V303A and transmit crypto step relay K201. In positions 1 and 2 of bank 1B of switch S201 positive potential is applied to the grid of tube V302B which causes this tube to conduct heavily and to clamp the anode of tube V302A near ground potential so that this stage is inoperative. Further when the anode of V302A is clamped at a low potential tube V303A is cut off by the negative bias potential applied to its grid. When switch bank 1B is thrown to positions 3 or 4 a negative potential is applied to the grid of tube V302B which cuts this tube off and unclamps the anode of stage V302A, rendering the stage normally operative. However it is not desirable that unclamping occur instantaneously for reasons to be pointed out later. Accordingly the time constant of the circuit C214–R242 has such a value that about two seconds elapses from the time switch bank 1B is thrown to position 3 or 4 until tube V302B is cut off.

The 22 ms. positive pulses on the anode of stage V301B in the TD step circuit are applied to the grid of tube V302A. These pulses coincide with the pulses shown in Fig. 4(c). Assuming switch bank 1B in position 3 and stage V302A unclamped, the operation of this stage is similar to that of stage V301B. Tube V302A normally conducts heavily since its grid is connected to positive potential and, due to the drop in resistors R308 and R309, assumes a potential slightly above that of the cathode. During a positive pulse on the anode of V301B condensers C302 and C303 charge to a higher voltage, however the conduction in tube V302A is not appreciably affected since the grid of this tube cannot be driven to an appreciably higher potential due to grid current drop across resistors R308 and R309. At the trailing negative-going edge of the pulse the sharp drop in the anode potential of tube V301B together with the increased negative voltage across condensers C302 and C303 drive tube V302A into cut-off causing a sharp rise in its anode potential. As condensers C302 and C303 discharge through resistors R307 and R308 the grid of V302A rises toward cut-off and after reaching this point full conduction in the tube soon recurs with a sharp drop in anode voltage. The time constant of the discharge circuit is so selected that the positive pulse so formed on the anode of tube V302A has a duration of approximately 22 ms. The leading edge of this pulse is delayed relative to that of the pulse on the anode of V301B by the duration of the latter pulse, which is approximately 22 ms. The positive pulse on the anode of V302B is applied to the grid of V303A and causes a coincident flow of current through the winding of crypto step relay K201. Energization of this relay closes contacts 6–7 and results in coincident current flow through release magnet 104 of transmit crypto unit 19. These crypto step pulses lag the pulses on the anode of V301B, and therefore the TD step pulses in the TD release magnet which are coincident therewith, by 22 ms. The construction of the TD and crypto units is such as to require this phase difference in step pulses for synchronous operation of the two units.

The TD unit 17 operates in conjunction with TD signal relay K202 to convert the character groups recorded on the tape which passes through the TD unit into electrical pulse character groups, such as shown in Fig. 4(e), which appear at J202. TD unit 17 is a standard unit the construction and operation of which is well understood in the art and therefore need not be described in detail here. Briefly, however, as seen in Fig. 2, it comprises an inner segment 105, a stop segment represented by the vertical arrow beneath the segment at the left, and five character pulse segments and contacts represented by the remaining five arrows. The inner segment 105 is connected to terminal 4 of TB101. The stop segment is permanently connected to terminal 3. The punchings in the tape determine which of the character segments are connected to terminal 3, the mechanism for accomplishing this not being shown in the drawing. A brush, also not shown, is set in motion by the release magnet and bridges the gaps between the inner segment and the character and stop segments in succession, the drawing indicating the gap between inner and stop segments being bridged. The final result is that a mark is represented by a connection between terminals 3–4 of TB101 and a space by an open circuit between these terminals. Terminals 3–4 are connected in series with coil 2–3 of relay K202 and a source of direct potential. When a connection is made between terminals 3–4 of TB101 coil 2–3 of relay K202 is energized closing contacts 6–7 of the relay and producing a positive voltage or mark pulse at J202. Breaking the connection between terminals 3–4 of TB101 deenergizes coil 2–3 of relay K202 and allows continuously energized coil 1–8 to close contacts 4–6 of the relay. This produces zero voltage or a space pulse at J202.

The transmit unit 19 operates in conjunction with mixer relay K203 to convert the clear text TT signal produced by the TD unit into an enciphered TT signal. The transmit crypto unit, like the TD unit, is a standard item the construction and operation of which is understood in the art and need not be described in detail here. Briefly, however, as shown in Fig. 2, it comprises an inner segment 106, active segments numbered 1–5, start segment 107, stop segments 108 and a number of inactive segments. Brush 109 is set in motion by the crypto step pulse, applied to release magnet 104, at the proper time to move in synchronism with the brush of the TD unit, so that the brush 109 is at the center of each of active contacts 1–5 at the same time that the TD brush is at the center of the corresponding one of its five character segments. Each of the active segments 1–5 is connected to terminal 5 of the crypto unit for a space or to terminal 4 for a mark by suitable contacts associated with each as shown in the drawing. These contacts are actuated to either the mark or the space condition by the cipher tape at the same time that the character segment contacts of the TD unit are actuated by the message tape. The clear text TT signal appearing at J202 is applied to inner segment 106 of the crypto unit. The arrangement is such that, when brush 109 is on any one of the active segments 1–5, one of the following conditions will exist:

|     | Pulse on Inner Segment | Setting of Active Segment | Contacts of Mixing Relay K203 Closed |
| --- | --- | --- | --- |
| (1) | M | M | 6-7 (M) |
| (2) | M | S | 6-4 (S) |
| (3) | S | M | 6-4 (S) |
| (4) | S | S | 6-7 (M) |

The start segment 107 of the crypto unit is permanently connected to terminal 4 and is therefore the equivalent of an active segment set for a mark. Since the crypto brush is on the start segment at the same time that the TD brush is on the TD start segment, which always produces a space, the result is the same as for condition (3) above, and a space is produced by relay K203. At the end of its cycle of operation the crypto brush passes over the stop segments and stops on the inactive rest segment. In passing over the stop segments voltage is applied directly to relay K203 to produce a mark.

The operation of the crypto unit and associated circuits is illustrated more accurately by wave forms (i) and (j) in Fig. 4. Wave form (i) represents the voltage at J202 and wave form (j) the voltage at J203 when all of the active contacts 1–5 of the crypto unit are set for mark. With this setting the enciphered TT signal is the same as the clear text TT signal. The brush of the TD unit requires 22 ms. to pass over each of its segments, however the brush of the crypto unit requires only 4 ms. to pass over each of the active segments of the crypto unit. Assume that a cycle of operation has just begun in both TD and crypto units. In this case the TD brush has just started to move over the start segment and the crypto brush has just started to move off the inactive rest segment toward the start segment. Contacts 6–7 of relay K203 are still closed for the stop pulse of the preceding character group. Nothing happens until the crypto brush reaches the start segment. At this point current flows from positive terminal 110 through R111, R114, terminals 2–3 of relay K203, terminal 4 of crypto unit, start segment 107, inner segment 106, contacts 4–6 of relay K202 which are closed during a space, and R217 to negative terminal 111. This current flowing through coil 2–3 of relay K203 overcomes the flux produced by holding coil 1–8 and closes contacts 6–4 of this relay. Although the current flow lasts for only 4 ms., contacts 6–4 remain closed due to the holding current now flowing from positive terminal 112 through R220, terminals 8–1 of the holding coil, R221, contacts 4–6 and R222 to negative terminal 113. The closure of contacts 6–4 produces zero or space voltage at J203. The 4 ms. current flowing through resistor R217 produces a small voltage drop across this resistor which is seen as a 4 ms. positive pulse in the center of the start pulse at J202. Nothing further happens until the crypto brush reaches active segment 1, which requires 22 ms., after leaving the start segment. Before this time the TD brush has already reached the first character segment and caused contacts 6–7 of relay K202 to close producing positive or mark voltage at J202. Current now flows from positive terminal 114 through R218, contacts 7–6 of relay K202, inner segment 106 of the crypto unit, active segment 1, terminals 3–2 of relay K203, R114 and R112 to negative terminal 115. This 4 ms. current, which flows in the opposite direction to the preceding current, overcomes the effect of holding coil 1–8 and closes contacts 6–7 of the relay. This current also produces a slight increase in voltage drop across resistor R218 and accounts for the small 4 ms. negative-going pulse in the center of the pulse #1 at J202. Holding current now flows from positive terminal 116 through R223, contacts 7–6, R221, terminals 1–8 and R219 to negative terminal 117 thus holding contacts 6–7 closed after cessation of the 4 ms. current. Closure of contacts 6—7 produces positive or mark voltage at J203.

The above process continues in a similar manner throughout the character group. Since pulse #5 is indicated as a mark, contacts 6—7 of relay K203 are already closed when the crypto brush reaches the stop segment and no action takes place. It is seen that the difference in size between the active segments of the crypto and the TD units results in a 9 ms. delay of the enciphered TT signal at J203 relative to the clear text TT signal at J202. This delay is of no consequence in the operation of the TT system. The small 4 ms. pulses appearing at J202 are referred to as sampling pulses and serve a useful purpose in that they serve to indicate the accuracy of the synchronization between TD and crypto units. With proper synchronization of the two units the sampling pulses appear in the exact center of the broader TD pulses.

The TT signal output of mixer relay K203 is applied to the signal winding 2—3 of line relay K205 when bank 3a of S201 is in positions 2 or 3. The line relay is designed for either neutral or polar operation. For neutral operation the line is connected to terminals 7—8 of TB101 with TB102 and TB103 open. For polar operation TB102 and TB103 are closed, battery is connected between terminals 6—8 and the line is connected to terminals 5—7. The line may extend to a distant TT station or may extend to a radio transmitter or carrier terminal equipment where a radio or carrier current transmission link is employed.

When the TD is shut off, as by removal of the message tape, release current continues to operate the release magnet of the crypto unit. Since the TD rests on its stop segment contacts 6—7 of TD signal relay K202 remain closed and continuous mark voltage is applied to inner segment 106 of the crypto. This results in cipher being applied to the line which is undesirable from the standpoint of code security. Crypto disable circuit 20 operates, after an interval of thirty-three seconds following TD shut-off, to prevent such application of code characters to the line. The thirty-three second interval is provided so that routine tape changes will not cause disabling of the crypto unit.

The disable circuit comprises tubes V304A, V304B and crypto disable relay K204. The crypto unit is disabled by a flow of current in V304B which closes contacts 6—7 of crypto disable relay K204 and short circuits the M and S contacts of the crypto unit. When the TD unit is operating V304B is biased beyond the cut-off point by the negative voltage across R325. This voltage is opposed by the positive voltage across condenser C308, however, during TD operation the condenser voltage is kept at a low value by the following process: At the end of each TD step pulse K301 is energized and contacts 4—5 open ungrounding the lower end of R327. During the ensuing crypto step pulse contacts 6—7 of crypto-step relay K201 are closed and a positive pulse is applied to the grid of tube V304A through R327 and to its anode through R328 and R329. The simultaneous positive pulses on grid and anode of this tube cause it to conduct and condenser C308 to discharge through the tube to a low value of voltage. Since these pulses repeat at the TD step frequency and since the charging path of condenser C308 has a high time constant, the condenser is not able to charge to a sufficiently high voltage to drive V304B out of cut-off driving TD operation. However, when the TD unit is shut off the circuit through its release magnet is broken and relay K301 can no longer be energized. Consequently, contacts 4—5 of this relay remain closed and the lower end of R327 remains grounded so that the above mentioned positive pulses can not now be applied to the grid of V304A. Due to the high negative bias on this grid, resulting from the voltage across R324, positive pulses on the anode alone are not able to cause conduction in the tube and no discharging of condenser C308 can occur. Condenser C308 therefore begins to charge and the time constant of its charging circuit is so selected that after approximately 33 seconds the voltage on the grid of V304B has risen above the cut-off point and crypto disable relay K204 is actuated. During the time that the crypto unit is disabled step current continues to operate its release magnet, the unit being disabled only to the extent of preventing cipher characters from being applied to the line.

One additional situation must be provided for in the transmitter. As long as the TD unit is operating a start pulse (space), coincident with the crypto step pulse, is included as the first pulse in each character group. As already pointed out the distant receiving station utilizes the start pulses to synchronize the receive crypto unit with the transmit crypto unit and to correct the timing of its step pulse generating circuits. In order to continue to supply the receiving station with these pulses when the TD unit is shut off an artificial start pulse generating circuit is provided. This circuit functions as follows: When the TD unit is shut off it comes to rest on its stop segment thus energizing coil 2—3 of relay K202 and closing contacts 6—7 thereof, the effect of the normal current in coil 1—8 being overcome by the current in coil 2—3. However, when contacts 6—7 of crypto step relay K201 are closed for the production of the crypto step pulse, R213 is connected in shunt to R214 and R215 which raises the current in coil 1—8 of relay K202 sufficiently to overcome the effect of the current in coil 2—3 and closes contacts 6—4. Since contacts 6—4 of K202 are closed when the brush of the crypto unit passes over its start segment a space is applied to the line, as shown in Fig. 4(b), which serves the same purpose at the receiving station as the normal start pulse.

The receiver section 13 of the TT station is shown in block form in Fig. 1 and in detail in Figs. 3a and 3b. The main function of the receiver is to keep the receive crypto unit operating in step with the crypto unit of the distant transmitting station. In addition it performs the following subsidiary functions: (1) It reshapes and deciphers the enciphered TT signal derived from the incoming receive line. (2) It produces step current pulses to operate the release magnet of the receive crypto unit. These pulses are either derived from the start pulses of the line signal or, in the case of a line break, from its own frequency dividers which are energized from the local frequency standard but are kept in synchronism, until the instant of line break, with the received signal. (3) It shuts off the printer after the TD unit at the distant transmitting station is off for a predetermined length of time.

The signal input section 118 of the receiver consists of signal input relay K401, a low-pass filter incorporating elements L401, C405A and C405B, and two shaper-clipper stages V401A and V401B. The wave form of the received TT signal may depart considerably from that of the transmitted signal due to various distorting factors present in the transmission link and also due to noise energy derived from the transmission link. It is the function of the signal input section to restore the received signal to substantially its original form. The reshaped signal appears at the anode of tube V401B and is shown in Fig. 5(a) as the enciphered letter "D", assuming that at the distant transmitter the text letter was "Y" and the cipher letter "A" as illustrated in Fig. 4(a), (b) and (c). It will be noted that the signal at this point is inverted in phase relative to the normal transmitted signal. The operation of the signal input section is well understood in the telegraph art and need not be described in detail here.

The voltage on the anode of V401B is applied to signal relay section 119 which comprises tube V402A and signal relay K402. This circuit re-inverts the signal so that a TT signal of proper phase, as shown in Fig. 5(b), appears at J404.

The received enciphered TT signal, of proper phase, as it appears at J404 is applied to the inner segment 106' of receive crypto unit 19'. The receive crypto unit is identical in construction and operation to the transmit crypto unit which has already been described in detail. If the M (mark) and S (space) contacts associated with active segments 1-5 of the crypto unit are set by the crypto tape for the cipher letter "A," as shown in Fig. 5(c), the deciphered letter "Y" appears at J205 as shown in Fig. 5(d), the same laws of multiplication being followed ($M \times M = M$, $M \times S = S$ and $S \times S = M$) as in the transmit crypto circuit. The 4 ms sampling pulses appearing in the signal at J404 and shown in Fig. 5(b) are produced in the same manner as those appearing at J202 in the transmitter section and are due to the presence of resistors R425 and R426 associated with signal relay K402.

The deciphered signal output at J205, with switch S204 in the "cipher" position, as applied through bank 2B of this switch to the printer relay section 120. If the received signal is in clear text switch S204 is placed in the "text" position and the signal is applied through R250 and bank 2B of the switch directly to the printer relay section. The purpose of this section is to supply signal current to operate the selector magnet of printer 121. It consists of relay driver stage V402B and printer relay K201. The TT signal is applied to the grid of V402B and the actuating coil 2—3 of K201 is connected in the plate circuit of this tube. The printer circuit is connected to terminals 11 and 12 of terminal board TB101. The current flowing in the printer magnet is of substantially the same wave form and phase as the TT signal voltage at J205 or, for clear text transmission, at J404. A low pass filter circuit comprising R428 and C408 is for the purpose of preventing short time constant pulses from appearing at the grid of V402B.

The purpose of gate circuit 122 is to separate the start pulses from the remainder of the TT character group. This is done by making the circuit react only to the start pulses and rendering it insensitive to the intelligence and stop pulses. The gate circuit acts as a positively triggered, one-cycle multivibrator, the leading edge of the start pulse providing the triggering impulse. The gate circuit comprises gate trigger stage V403A, gate clamper V404A, cathode follower-baseline stabilizer V405, triggered pulse generator V404B, and short gate eliminator V403B. The input signal for the gate circuit is applied to the grid of V403A and is derived from the anode of V401B in the receiver input section. This signal is shown in Fig. 5(a) and, as has already been pointed out, is inverted.

V403A is biased at about −30 volts, which is beyond the cutoff point, and is normally nonconductive. V404B is normally conductive. Clamping tube V404A, which obtains its bias from the drop across R445 and the negative source attached thereto, is biased beyond cut-off when V404B is conductive and therefore is normally nonconductive and exerts no clamping action. V403B is biased by the voltage drop across R437 and the negative source attached thereto and is normally conductive. V405A is normally fully conductive so that the potential of its cathode relative to ground is about +150 volts. The above designated normal conditions are those existing just prior to the leading edge of a start pulse.

The input signal is first differentiated by C409—R430 to produce the series of sharp pulses shown in Fig. 5(e). The positive pulse due to the leading edge of the start pulse produces maximum conduction in V403A. The resulting drop in plate voltage is applied directly to the grid of cathode-follower stage V405A which causes the potential of its cathode, at which point the gate voltage is developed, to drop to its minimum value of about +50 volts. This minimum value is fixed by base-line stabilizer V405B which conducts continuously and establishes the minimum value of current through R435. The negative-going voltage at the cathode of V405A is applied through C412 and R442 to the grid of pulse generator stage V404B.

The grid of V404B is connected to positive potential through R442, R441 and R440. Therefore, it is normally maintained through grid current flow at a potential only slightly positive relative to the cathode. Condenser C412 normally has a charge with the polarity indicated obtained from the voltage drop across R435, the condenser having charged through the grid circuit of V404B. Since the voltage across C412 cannot change instantaneously the drop in voltage of the cathode of V405A pulls the grid of V404B down with it to a potential of about −90 volts, the 100 volt drop of the cathode less about 10 volts across R442 due to grid current. This action cuts V404B off. The wave forms on the anode of V403A, the cathode of V405A, the grid of V404B and the anode of V404B are shown in Figs. 5(f), (g), (h) and (i), respectively.

When V404B becomes nonconductive a positive-going voltage, from potential divider R444—R445, is applied to the grid of V404A. This voltage is of sufficient magnitude to produce full conduction in this tube. The grid voltgae of V404A is shown in Fig. 5(j). The low impedance of this tube when fully conductive effectively clamps the anode of V403A to ground and thereby prevents a rise in its potential at the termination of the start pulse of sufficient magnitude to cause conduction in V405A, which is now cut off by the voltage across R435. The slight negative dips in the anode voltage of V403A which occur in spite of clamping tube V404A when subsequent positive pulses are applied to the grid of the tube do not appear at the cathode of V405A also because this tube is now cut off.

As soon as the above described events have taken place condenser C412 starts to discharge through R435, the +150 volt supply, R440 and R441, and the potential of the grid of V404B starts to rise toward the cut-off points. When the grid potential reaches cut-off tube V404B starts to conduct, shortly thereafter reaching full conduction with the grid at its normal slightly positive potential relative to the cathode. The time constant of the condenser discharge circuit may be adjusted at R440 and is set to such a value that conduction in tube V404B occurs during the stop pulse of the TT character group, a suitable time being approximately 142 ms. after the leading edge of the start pulse. Conduction in V404B lowers its anode potential and as a result the grid potential of V404A is lowered below the cut-off point, thus removing the clamping effect of this tube. As a consequence the anode potential of V403A rises to its maximum value and the grid and cathode of V405A follow suit. The rise in voltage of the cathode of V405A to its maximum value terminates the gate. Tube V403A is now in an operative condition and ready to initiate the generation of another gate at the leading edge of the next start pulse.

Short gate eliminator stage V403B is used to guard against a line break of short duration which may occur between the end of the gate pulse, when V403A is rendered sensitive, and the leading edge of the next start pulse. Such a line break could cause a positive pulse to appear at the grid of V403A and thus undesirably trigger the gate circuit. If this should be allowed to happen the resulting gate would probably be too short since it is unlikely that the charge on condenser C412 would have had time to return to normal following the termination of the preceding gate. A below normal charge on C412 would result in a negative voltage on the grid of V404B of smaller amplitude than normal which, in turn, would not keep V404B cut off for the full gate time. Consequently, V404B would generate a gate of time duration shorter than normal. Such a gate is undesirable since it could change the timing of the crypto step pulse, as will be seen later, and thereby disrupt synchronization. Stage 403B prevents this by applying a negative pulse to the grid of V403A to cancel out any positive voltage on this grid caused by a short time break at the time mentioned, thereby preventing the circuit from generating a gate until the next start pulse arrives.

The action of the short gate eliminator stage is as follows: During the gate, V403B is cut off by the negative bias derived from the source of negative potential to which its grid is connected through R437. At the end of the gate the rising potential of the cathode of V405A is applied to the grid of V403B causing this tube to conduct and its anode potential to drop sharply. This drop in voltage is fed to the grid of V403A through differentiating circuit C411—R430 in the shape of a sharp negative going pulse, visible in Fig. 5(e), which cancels out any positive voltage on the grid of V403A caused by a short line break at the time mentioned.

A line break of long duration, i. e. extending over at least several character group transmissions, usually results in improper gate generation for the first several character groups following repair of the break. This is due to the fact that tube V403A of the gate circuit remains sensitive during the break and is triggered by the first positive pulse following repair of the break, which usually is not a start pulse. A typical example of the operation of the gate circuit under this condition is shown in Fig. 5(k). Assume that a line break is repaired during transmission of the fourth character pulse of the letter "Y." Since this pulse is positive the gate circuit will be immediately triggered to produce a gate of the normal 142 ms. duration. This gate, designated gate 1 in the drawing, ends during the second character pulse of the succeeding letter "D." The next occurring positive pulse is pulse 5 of letter "D" which initiates gate 2 that ends during pulse 3 of the letter "A." Since the next positive pulse to occur is the start pulse of the character group following the "A" group, gate 3 and all succeeding gates will be properly related to their respective character groups. Therefore, following repair of a line break, the gate circuit soon settles itself to produce the desired gate pulse. The maximum possible number of successive character groups, regardless of their order, that are needed to settle the gate circuit after a line break has ended has been calculated to be twelve.

The circuit details of the gate fill-in section 123 of Fig. 1 are shown in Fig. 3a. The purpose of this circuit is to generate two voltages for actuating the line break control section to be described later. The first of these voltages is an inversion of the gate voltage and concurrent therewith. The second is a positive square wave initiated at the end of the gate and having a duration equal to the interval, 33 ms., between normal gates. The gate fill-in circuit comprises tubes V406A and V406B and its operation is illustrated by the wave forms of Fig. 6. The gate voltage appearing at the cathodes of V405 is applied through R446 and R448 to the grid of V406A. The grid of this tube is also connected through R447 to a source of negative bias of sufficient magnitude to cut the tube off during the gate. However, at the end of the gate the sudden rise in voltage of the grid of V406A produces a corresponding sudden drop in voltage of the anode of this tube which is transmitted through C413 and R452 to the grid of V406B, which is fully conductive, and drives it far below the cut-off point. The discharge current of C413 flowing through R451 maintains V406B in cut-off for a length of time depending upon the time constant of the discharge circuit. As C413 discharges the grid of V406B rises toward the cut-off potential and when this point is reached the tube again becomes fully conductive. The result of this process is a positive square wave of voltage on the anode of V406B which, by proper adjustment of the above mentioned time constant, is made to equal the normal time interval between gate pulses (33 ms.). This voltage is shown in Fig. 6(e) and is used, along with the inverted gate voltage shown at (c), in the line break control circuit.

The function of the line break control section 124 of Fig. 1 is to provide D. C. voltages at different levels to activate the gate inverter 125 and the binary control 126, to be described later, for the two conditions of TT operation (the normal line condition and the line break condition). The line break control section comprises mixer stage V407, line break clamper control stage V408 and line break indicator control stage V210A, and is shown in detail in Fig. 3b. The wave forms occurring in this circuit are shown in Fig. 7. The voltages provided by the line break control section are derived from a potential divider connected between a point at +300 volts and another point 127 at —150 volts and consisting of the space path of V408A, R462, R463 and R464. The voltage at point 128 is applied to the gate inverter and that at point 129 to the binary control section. When the voltage on the grid of V408A, which acts as a cathode follower, has a low value, for example +10 volts relative to ground, the cathode of this tube likewise has a potential of substantially +10 volts relative to ground and points 128 and 129 have low voltages, for example —50 and —60, respectively, relative to ground. If the grid potential of V408A is raised to a higher value, for example +150 volts, the cathode likewise assumes this higher voltage and points 128 and 129 as a result assume higher potentials of for example +35 and +20 volts respectively. It is desired that the line break control circuit produce the lower values of potential at points 128 and 129 during the presence of a normal line signal, when a gate is generated, and that it produce the higher values of potential at these points during a line break, when no gate is generated. The circuit accomplishes this function as follows: The voltages appearing at the anodes of V406A and V406B are applied to the grids of V407B and V407A, respectively. Taking into account the potential reduction of the coupling circuit and the bias on V407 the two grid voltages vary over the range shown in Fig. 7(a) and (b). The voltages represented at (a) and (b) are those obtained during normal operation and with a gate of normal length (142 ms.) being generated. Since a grid potential of +0.1 volt is sufficient to produce full conduction in V407A or V407B it is seen that for this condition either one or the other of the tubes is fully conductive and the voltage of the parallel connected anodes has the low value of +10 volts, as shown in Fig. 7(c). This voltage is applied to the grid of V408A and results in the lower values of voltage at points 128 and 129. During a line break no incoming signal is received and consequently no gate is generated. In the absence of a gate V406A and V406B of the gate fill-in circuit (Fig. 3a) remain in a fully conductive state and their resulting low anode potentials cause the grid potentials of V407A and V407B to remain at their lowest value which, in the example shown, is —40 volts. At this grid potential V407A and V407B are both cut off and the potential of their anodes has its maximum value of +150 volts. This potential is applied to the grid of V408A and results in the higher values of voltage appearing at points 128 and 129.

The V407 anode voltage is also applied through an integrating circuit, consisting of R461, C414 and C415, to the grid of line break indicator control tube V210A. During normal operation with a gate of normal length, the +10 volts at the V407 anodes is insufficient to light the indicator lamp E210 in the cathode circuit V210A. During a line break, the +150 volts at the anodes of V407 is sufficient to light E210 continuously thus giving an indication of the line break. The indicator lamp also gives a flashing signal in the presence of a line signal if the gate circuit is producing a gate that is of too short duration. This is accomplished as follows: A narrow gate causes the positive-going pulses in the wave applied to the grid of V407A, shown in Fig. 7(d), to occur earlier than normally since they correspond to the gate fill-in pulses, Fig. 6(e), which are initiated at the end of the gate. Further, the duration of these pulses does not change from the 33 ms. fixed duration of the gate fill-in pulses. The voltage wave applied to the grid of V407B in the presence of a narrow pulse is shown in Fig. 7(e). From these wave forms it is apparent that an interval exists between the end of the gate fill-in pulse as seen in (d) and the beginning of the gate as seen in (e) during which both V407A and V407B are cut off. This results in positive voltage pulses on the anodes of V407, as seen in (f), which, when applied to the grid of V210A, cause flashing of lamp E210 indicating improper adjustment of the gate circuit.

The gate inverter section 125 of Fig. 1 performs two functions. First, it inverts the gate pulses so that they are applied to the crypto step input circuit with the proper polarity. Second, it prevents random pulses, which appear at the output of the gate section during a line break, from affecting the crypto step section. The gate inverter section comprises tubes V409A and V409B, and is shown in detail in Fig. 3a. V409B acts as a clamping device for V409A such that when V409B is conductive the anode of V409A is clamped to ground, thus rendering this stage inoperative. The grid voltage for V409B is derived from point 128 in the line break control section (Fig. 3b). During normal operation the potential of this point has its lower value of —50 volts which cuts tube V409B off and allows normal operation of V409A. Under these conditions V409A inverts the gate pulse derived from the cathodes of V405 and applies the inverted gate to the crypto step input circuit. During a line break, however, the potential of the above mentioned point has its higher value of +35 volts which produces full conduction in V409B and renders V409A incapable of transmitting any signal from the gate circuit to the crypto step section.

As stated above, during normal operation an inverted gate pulse is applied to the crypto input circuit from the anode of gate inverter stage V409. This wave form is shown at (c) in Fig. 8 in which the received TT signal and the gate are shown at (a) and (b) for reference purposes. Also, there is applied at all times to the crypto input circuit a square wave having the same frequency as the gate wave, namely 5.7 cps., and derived from the last binary frequency divider of the three binary dividers making up the frequency divider section 130 as shown in Fig. 1. This wave is shown in Fig. 8(d) and is derived by three successive binary divisions of a 45.8 cps. square wave derived from the frequency standard generator 11 of Fig. 1. Moreover, during normal operation, binary control circuit 126 of Fig. 1 operates with each generated gate pulse to synchronize the square wave (d) with the gate. The accuracy of the synchronization is such that, for reasons to be explained later, the lag of the positive going edge of wave (d) relative to the leading edge of the gate, indicated by L in Fig. 8, does not exceed the period of the 45.8 cps. square wave, which is 22 ms. During normal operation the positive-going edge of wave (c) is used to generate the crypto step pulse. During a line break wave (c) is not present and the positive-going edge of square wave (d) is utilized for this purpose.

The frequency divider section is shown in detail in Fig. 3a and comprises binary dividers V411, V413 and V415. The 45.8 cps. square wave derived from the frequency standard is applied through differentiating circuits to the grids of both sections of V411. Due to the differentiating circuits the positive-going edges of the square wave produce sharp positive pulses on both grids and the negative-going edges produce sharp negative pulses on both grids. Accordingly, for each cycle of the square wave there are one positive pulse and one negative pulse applied to the grids. V411 is connected in a circuit having two stable conditions, commonly referred to as an Eccles-Jordan circuit, in each of which one tube is fully conductive and the other cut off. However, the circuit is designed so that it can be switched from one condition to the other only by application of a negative pulse to the grid of the conductive tube. This is accomplished by biasing the grids so negatively that a positive pulse is unable to produce conduction in the tube that is cut off. Since the circuit is switched only once for each cycle of the incoming square wave, the output square wave, derived from the anode of V411B, has one-half the frequency of the input wave. The remaining two E–J circuits comprising tubes V413 and V415 are identical to that comprising tube V411 and likewise act to divide the applied frequency by two. Each of these circuits is triggered by the output wave of the preceding circuit which is applied to its grids through buffer-inverter stages V412B or V414B. The purpose of the buffer-inverter stages is to permit all three divider circuits to switch simultaneously following a line break, as will be explained later. The output square wave of the frequency divider section is taken from the anode of V415B and has a frequency of one-eighth the 45.8 cps. applied wave or approximately 5.7 cps.

The function of the binary control section 126 of Fig. 1 is to regulate the frequency divider section. The binary control section is shown in detail in Fig. 3a and comprises triggered pulse generator V410A, line break clamper V408B, and three binary pre-setters V412A, V414A and V410B. The grid voltage of V406B in the gate fill-in circuit, shown in Fig. 6(d) and reproduced 8(e) for reference purposes, is applied to the grid of V410A. The effect of this voltage is to cut off V410A between gates thus allowing its anode voltage to assume its maximum value of +150 volts. The anode of V410A is directly coupled to the grids of pre-setter tubes V410B, V414A and V412A with the result that the grid voltages of these tubes are as shown in Fig. 8(f). Due to the high voltage on the grids of the pre-setter tubes during the 33 ms. intervals between gate pulses these tubes are driven into current saturation and the voltage of their anodes drops to near zero. Since the anodes of V410B, V414A and V412A are directly coupled to the anodes of binary divider tubes V415B, V413B and V411B, respectively, the voltages of these anodes are likewise reduced to nearly zero with the result that the three binary dividers are simultaneously and similarly preset during each interval between gates to the stable condition in which the A tubes are nonconducting and the B tubes are conducting. During gate intervals the voltage on the grid of V410A is +0.1 volt which causes plate current saturation and an anode voltage that is too low to produce conduction in the binary pre-setters. Consequently the binaries are permitted to divide freely during the gate intervals. The binaries are permitted to divide freely also during a line break. The reason for this is that during a line break the grid of clamper V408B, which derives its potential from point 129 in the line break control section (Fig. 3b), has its higher value (+20 volts) which saturates this tube and thereby clamps the anode of V410A to substantially ground potential. The resulting low potential on the grids of pre-setter stages V410B, V414A and V412A is insufficient to cause conduction in these tubes and the binary dividers are consequently free to operate.

As stated above, during normal operation, all three binary dividers are preset to the same condition, i. e. the A tubes nonconductive and the B tubes conductive, during each of the 33 ms. intervals between gates, or, in other words, during each gate fill-in pulse. When a line break occurs the last received start pulse of the TT signal initiates a final gate of normal 142 ms. duration and the trailing edge of this gate initiates a final gate fill-in pulse and simultaneously therewith a final negative pulse, as shown in Fig. 8(e), on the grid of V410A. Consequently, during the interval of the final gate fill-in pulse a final presetting of the binaries occurs. At the end of the gate fill-in pulse the three binaries are unclamped by the three pre-setter stages and are free to divide beginning with the next negative pulse applied to the grids of first divider stage V411. Clamping tube V408B is held in a nonconductive state by the line break control circuit until the end of the gate fill-in pulse. At the end of this pulse, at which time the binaries have already received their final presetting, tube V408B becomes conductive and clamps the anode of V410A to ground for the duration of the line break. This prevents the transmission of any spurious pulses to the pre-setter stages which might interfere with the operation of the binary dividers during a line break. Therefore, during a line break, the binary frequency divider section continues to produce a 5.7 cps. square wave at the anode of V415B which is identical to that shown in Fig. 8(d) except that the small negative pulses in the negative half cycle of the wave caused by the clamping action of V410B are absent. When a line break occurs and the binaries are unclamped in the manner described above, it is desirable that frequency division does not take place in a binary unless the succeeding binary has been unclamped first. If this is not arranged, improper frequency division is apt to occur. It is necessary, therefore, that V410B unclamp V415, V414A unclamp V413 and V412A unclamp V411, in that order. For this reason the R-C time constant networks at the grids of the pre-setters are arranged so that the network of V412A has the longest time constant and that of V410B the shortest time constant.

The phase relation between the square wave output of the frequency divider section and the gate generated during normal operation is established as follows: As explained above, the binaries are preset and ready for operation at the end of the final gate fill-in pulse. The next negative trigger pulse applied to the grids of first divider stage V411 causes this stage to switch to the condition in which V411A is conductive and V411B is nonconductive. This is accompanied by a positive-going wave front at the anode of V411B. This wave front is converted to a negative-going wave front by inverter V412B and results in negative trigger pulses being applied to the grids of second divider stage V413. As in the first stage the negative pulses cause a switch of this circuit to the condition in which V413A is conductive and V413B nonconductive. This action is likewise accompanied by a positive-going wave front at the anode of V413B which, after inversion by stage V414B, initiates a similar switching action of final divider stage V415 and a similar positive-going wave front at the anode of V415B. Therefore, the application of a negative pulse to the grids of V411 produces a simultaneous switching action in all three binary divider stages and simultaneous positive-going wave fronts on the anodes of the B tubes in the three stages. The important point in this is that the positive-going wave front at the anode of V415B, shown in Fig. 8(d), is coincident with the negative pulse applied to the grids of V411. The manner in which the binaries are preset by the binary control circuit, already explained, insures this result.

The interval L, indicated in Fig. 8(d), represents the lag of the positive-going edge of the 5.7 cps. square wave behind the leading edge of the last received TT start pulse. If a negative pulse is applied to the grids of V411 coincidently with the trailing edge of the gate fill-in pulse this lag is zero. The greatest possible interval of time that can occur between the trailing edge of the gate fill-in pulse and the application of a negative trigger pulse to the grids of V411 is 22 ms., the period of the 45.8 cps. square wave from the frequency standard. Therefore, L may have any value within the range 0–22 ms. The length of time following a line break during which this initial phase relation can be approximately preserved depends entirely upon the quality of the frequency standards at the transmit and receive stations.

The function of the crypto step input section 131 of Fig. 1 is to supply the crypto step section 132 with a square voltage wave, derived from the gate inverter output wave during normal operation and from the 5.7 C. P. S. square wave from the frequency divider section during a line break, which has a negative-going edge that either coincides with or approximately coincides with the leading edge of the received TT start pulse or else with the time at which the leading edge would have occurred had the start pulse been received. The details of this circuit are shown in Fig. 3(b). The circuit comprises the dual triode V416 in which the anodes are connected together and to a common load resistor. An inverted gate voltage derived from the anode of gate inverter V409A (Fig. 3a) and shown in Fig. 8(c) is applied to the grid of V416A. The 5.7 C. P. S. square wave derived from the anode of V415B in the frequency divider section (Fig. 3a) and shown in Fig. 8(d) is applied to the grid of V416B. These two triode sections are biased so that they are saturated by the maximum voltage of square waves (c) and (d) and are cut off by the minimum voltage of these waves. During normal operation the anode voltage of V416 is as shown in Fig. 8(g) and its form is governed almost entirely by the inverted gate signal on the grid of V416A. The wave (d) on the grid of V416B has little effect on the anode voltage during normal operation since V416A is already saturated during the positive half-cycles of (d) and as a result very little further depression of the anode voltage can take place. However, during line break operation, the wave (c) is not present on the grid of V416A, which is then cut off, and therefore the anode voltage of V416 is controlled entirely by the 5.7 ms. square wave on the grid of V416B and has the wave form shown in Fig. 8(h).

The purpose of the crypto step section 132 of Fig. 1 is to produce step current pulses for operation of the receive crypto release magnet. As shown in Fig. 3b the crypto step section comprises triggered pulse generator V417A, crypto step relay driver V417B, bank 2A of receiver switch S204 and receiver stepping advance-retard switch S203. During normal operation the square wave of voltage on the anode of V416, shown in Fig. 8(g), is differentiated by C441 and R503 and applied to the grid of V417A which is normally at about cathode potential due to its connection to +150 volts. Due to the limiting action of this tube on positive-going voltages the positive-going edges of wave (g) do not produce pulses on the grid. The negative-going edges of this wave however drive the grid of V417A well beyond its cut-off point as shown at (i) in Fig. 8. With V416 conducting, C441, previously charged by the positive pulse, discharges through R503 holding V417A in cut-off. The discharging rate is adjusted so that after a suitable interval, for example 45 ms., the grid voltage of V417A has risen to the cut-off point and the tube again becomes conductive. This process produces a positive voltage pulse on the anode V417A as shown in Fig. 8(j). These pulses are applied to the grid of driver stage V417B causing pulses of current to flow through winding 2—3 of crypto step relay K208. These pulses close contacts 6—7 of K208 causing step current to flow through the release magnet winding 104' of the receive crypto unit and also lighting crypto step indicator lamp E212. The crypto step current and the anode current of E417B have similar wave forms and are of the same phase, so that for practical purposes they may be generally represented by the same wave form (k) of Fig. 8. It will be noted that the leading edge of each receive crypto step current pulse coincides with the leading edge of a TT signal start pulse. As will be seen in Fig. 4, the leading edge of each transmit crypto step pulse also coincides with the leading edge of the TT signal start pulse. Therefore the crypto step pulses at both transmitter and receiver occur simultaneously and the two crypto units are stepped in unison.

During a line break the receive crypto is also stepped in unison with the transmit crypto by a process that is substantially the same as that described above. The difference is that during a line break the inverted gate is not applied to V416A so that this section remains nonconductive and the anode voltage of V416, shown in Fig. 8(h), is that produced by the 5.7 C. P. S. square wave supplied to the grid of V416B from the frequency divider section. The negative-going edge of the wave (h) lags that of wave (g), obtained during normal operation, by the interval L which, as already pointed out, lies within the range 0–22 ms. Wave (h), when applied to V417A, produces voltage waves on the grid and anode of this tube and a current wave through the crypto release magnet very similar to those shown at (i), (j) and (k), respectively, the waves of course all having the above mentioned delay L. This delay, although usually present to a greater or lesser degree during line break operation, is of no consequence since no TT signal is being received and therefore exact phasing of the receive crypto is not required. To maintain synchronism between transmit and receive cryptos with respect to the cipher it is only necessary to insure that the receive crypto step once for each step of the transmit crypto, and the delay L does not interfere with the accomplishment of this result. When the line signal is restored synchronization of course returns to normal.

When a line break is over the receive crypto unit continues to be stepped by the binary frequency divider output for an interval of from two to three seconds following restoration of the TT signal. The reason for this is to allow time for the gate pulse to settle to its proper position in which its leading edge coincides with the leading edge of the TT signal start pulse, as explained in connection with the gate section. This delay is accomplished by condensers C416 and C417 in the line break control circuit (Fig. 3b). Upon reappearance of the line signal the gate fill-in pulse again appears on the grid of V407A and the inverted gate pulse on the grid of V407B of the line break control circuit so that V407 again becomes saturated and the potential of the grid of V408A is immediately lowered to its minimum value. The rate at which the cathode of V408A drops in potential is determined by the discharge rate of C416 and C417. The circuit is so designed that for an interval of two to three seconds the potentials of points 128 and 129 remain sufficiently positive to keep clampers V409B and V408B effective. This prevents the gate inverter stage V409A from triggering the crypto step section and also prevents the three pre-setter stages V410B, V414A and V412A from becoming conductive and interfering with the operation of the binary dividers during the interval. At the end of the 2–3 second interval the voltages of points 128 and 129 will have reached a sufficiently low value to cut off clamper tubes V409B and V408B (Fig. 3a) and render them ineffective. At this point the inverted gate pulse on the anode of V409A is again applied to the grid of V416A in the crypto step input circuit (Fig. 3b) and takes over the function of stepping the receive crypto unit from the wave supplied by the frequency divider section. Also the gate fill-in pulse appearing on the anode of V410A is again applied to the grids of pre-setter stages V410B, V414A and V412A which resume their already described function of correcting the timing of the binary dividers. Normal operation of the receiver is now restored.

Should synchronization between transmit and receive cryptos be lost for some reason during a line break means are provided in the receive crypto step section, for use after restoration of the line signal to manually advance or retard the receive crypto one step at a time for the purpose of restoring synchronization. This device is shown in Fig. 3b in connection with the crypto step circuit and comprises switch S203, condensers C215 and C216, and resistors R247 and R248. When S203 is in the "normal" position operation of the crypto step circuit is unaffected by the advance-retard circuit and C215 and C216 are in a discharged condition due to the connection of R247 and R248 across their terminals. When S203 is in the "retard" position point 133 is connected through R509, C216 and R248 to —300 v. Immediately upon closure of S203 the potential of point 133 is lowered to its minimum value, which is considerably below the cut-off point for V417B, by the charging current of C216 flowing through R507. As C216 charges the potential of the grid rises, however, the circuit time constant is made such that V417B remains in cut-off for 175 ms., the period of one TT signal. Consequently, the stepping pulse applied to the grid of V417B during this interval is not transmitted by this tube and the receive crypto loses one step. C216 charges completely in approximately 175 ms. and the potential of point 133 returns to normal so that only one step is lost for each actuation of S203 to the "retard" position. Actuation of S203 to the "advance" position connects point 133 through R509, C215 and R247 to +300 v. This results in an immediate increase in potential of this point, due to the flow of charging current through R507, which keeps V417A continuously conductive and the crypto release magnet continuously energized for a period determined by the time constant of the C215 charging circuit. This allows the crypto unit to run freely, and since the free running cycle is somewhat less than the normal cycle, due to the absence of stops, the receive crypto unit gradually gains on the transmit crypto unit. The size of C215 is so selected that the crypto release magnet remains energized for sufficient time to permit the receive crypto unit to gain one step. At the end of this interval C215 becomes fully charged and the potential of point 133 returns to normal so that only one step is gained for each actuation of S203 to the "advance" position.

The printer shut-off section 134 of Fig. 1 prevents the printer from functioning when the TD unit of the transmitting station is turned off. This circuit, which is shown in detail in Fig. 3b, includes mixer stages V418 and V419, 25-second delay clamper V420A, 25-second delay control V420B, 2-second delay control V421A, printer shut-off driver V421B, and wafer 3A of S204.

Shut-off is accomplished by the conduction of V421B. When this occurs current continuously flows through the 2—3 winding of K207. As a result armature 6 is closed to contact 7 and remains there during the conduction period causing a current to flow through the printer's selector magnet. The motor of the printer then continues to operate but no printing takes place. In this manner, the printer is prevented from reproducing the "garble" resulting from the deciphering of the artificial start pulses received when the TD is turned off. This action does not take place until 27 seconds have elapsed from the time the TD unit is shut off. This delay is incorporated to prevent the printer from being shut off when the sending operator has to turn off the TD unit momentarily, such as for a change of message tapes.

The operation of the printer shut-off section may be understood by reference to the wave forms of Fig. 9. The voltage applied to the grids of V418B and V419B is derived from the anode of V417A in the crypto step section and has the form shown at (a). The input to the grid of V418A comes from the output of V401A in the receiver input section (Fig. 3a) which, during normal operation, may be any TT character groups such as shown at (b). Due to integrating network R510—C442, the wave form on this grid is as shown at (c). The voltage on the grid of V419A is derived from the voltage on the armature of K206, shown at (d). Due to the integrating network comprising C408 and associated resistances, the resulting wave form on this grid is as shown at (e). The voltages (c) and (a) on the grids of V418A and V418B, respectively, are mixed by V418 to produce the wave form shown at (f) on its anodes. Similarly, the voltages (e) and (a) on the grids of V419A and V419B, respectively, are mixed by V419 to produce the wave form (g) on its anodes. These wave forms result from the fact that when either of the grids of V418 or V419 are at their maximum voltage (+0.1 volt) the tube saturates and the parallel connected anodes have their minimum voltage.

The output of V419B, wave form (g), is coupled to the grid of V420B through C444 and R517, causing this tube to conduct during the positive pulses of the wave. This intermittent conduction of V420B, which is in shunt to C445, together with the long time constant of the condenser charging circuit prevents C445 from charging to the point at which V420A conducts. Therefore, with V420A nonconductive the wave (f) on the anode of V418 is applied to the grid of V421A causing intermittent conduction of this tube which, as in the case of V420B, prevents C448 from charging to the point at which V421B conducts. Therefore, during normal operation, V421B remains cut off and the printer operates normally.

When the TD at the sending station is turned off cipher continues to be sent over the line for about 33 seconds as explained earlier. The received cipher groups are mixed with the same cipher combinations in the receive crypto and the receive mixer section. The result is a "letters" combination of all marks for the intelligence pulses and a space for the start pulse. This wave, as it appears on the grid of V419A, is shown in Fig. 9(h). With waves (a) and (h) on the grids of V419 the anode voltage of this tube has a constant low value as shown at (i). With the plate voltage of V419 constant no positive pulses are applied to the grid of V420B and this tube remains in cut off. With V420B thus cut off C445 begins to charge through R521. After 27 seconds, as determined principally by the time constant of R521—C445, the voltage across C445 reaches such a value that V420A becomes conductive. With this tube conducting the plate of V419 is clamped and voltage variations can no longer be applied to the grid of V421A. As a result V421A remains in cut-off and C448 is permitted to charge. In approximately 2 seconds from the time V420A conducts the charge on C448 becomes large enough to permit V421B to conduct which, acting through K207, shuts off the printer. Printer shut off is therefore accomplished 25+2 or 27 seconds after the TD at the sending station is turned off.

After 33 seconds the circuit conditions change. Cipher is no longer sent through the transmit line. Start pulses only, supplied by the artificial start pulse circuit in the transmitter, appear on the line. As a consequence, wave form (h) appears at the grid of V418A and wave form (a) at the grid of V418B. The result is a constant low voltage on the anode of V418 such as formerly occurred on the anode of V419 and shown in Fig. 9(i). Since no voltage variations can be applied to the grid of V421A under this condition also, this tube remains cut off and V421B as a result continues to conduct. The printer consequently remains shut off. During this period cipher derived from the receive crypto unit is applied to the grid of V419A. The resulting positive pulses on the anode of V419 cause intermittent conduction in V420B, which prevents uninterrupted charging of C445 so that V420A remains cut off.

When the TD at the transmitter is again turned on it is necessary that the printer shut-off circuit be deactivated before the TT signal appears at the receiver. As already stated, when the TD is shut off the transmit crypto unit continues to send cipher for about 33 seconds after which it is disabled except for the start pulses which continue to be sent. After the 33 second interval these artificial start pulses operate through V418 to maintain printer shut-off. When the TD at the sending station is turned on the control arrangement is such that the crypto disable circuit is immediately deactivated but a delay of about 2 seconds is introduced before TD stepping begins. This permits the transmit crypto to put cipher on the line for about 2 seconds before appearance of the first TT signal. These cipher signals applied to V418A produce positive pulses on the anodes of V418 and on the grid of V421A thus discharging C448. As a result V421B is cut off and the printer becomes operative to reproduce the first received TT signal.

We claim:

1. A cryptographic teletypewriter communication system comprising a transmitting station, a receiving station and a transmission link between said stations, said transmitter station comprising a transmitter-distributor unit, a transmit cryptographic unit of the on-line synchronous type and a frequency standard, means controlled by said frequency standard for stepping said transmitter-distributor and transmit cryptographic units in synchronism, said receiving station comprising a receive cryptographic unit similar to said transmit cryptographic unit and a frequency standard of the same frequency as that at said transmitting station, means in said receiving station responsive to the received teletypewriter signal for stepping said receive cryptographic unit in synchronism with said received signal, means in said receiving station responsive to the received teletypewriter signal for synchronizing the frequency standard at said receiving station with said received signal, and means in said receiving station operative in the absence of a received teletypewriter signal for stepping said receive cryptographic unit in synchronism with the frequency standard in said receiving station.

2. A cryptographic teletypewriter receiving station comprising a receive cryptographic unit of the on-line synchronous type, a frequency standard having a frequency equal to the character group frequency of the received teletypewriter signal and a recorder, means for applying a received enciphered teletypewriter signal to said cryptographic unit, means for applying the resulting deciphered signal to said recorder, means operative in the presence of a received teletypewriter signal to step said cryptographic unit in synchronism with said signal, means operative in the presence of a received teletypewriter signal to synchronize said frequency standard with said signal, and means operative in the absence of a received enciphered teletypewriter signal to step said cryptographic unit in synchronism with said frequency standard.

3. A cryptographic teletypewriter station adapted to send and receive enciphered teletypewriter signals in cooperation with a distant similar station connected thereto by a suitable bidirectional transmission link, said station comprising a transmitter-distributor unit for generating in each cycle of operation thereof a teletypewriter character group signal consisting of a start pulse, a plurality of intelligence pulses and a stop pulse occurring in succession, a transmit cryptographic unit of the on-line synchronous type, a receive cryptographic unit of the on-line synchronous type, a recorder and a frequency standard, means controlled by said frequency standard for stepping said transmitter-distributor and said transmit cryptographic unit in synchronism, means for applying the output signal of said transmitter distributor to said transmit cryptographic unit, means for applying the enciphered output signal of said transmit cryptographic unit to an outgoing transmission circuit, means for applying a received enciphered teletypewriter signal to the input of said receive cryptographic unit, means for applying the deciphered output signal of said receive cryptographic unit to said recorder, means operative in the presence of received teletypewriter signal start pulses for stepping said receive cryptographic unit in synchronism with said start pulses, means for deriving a wave from said frequency standard having a frequency equal to the stepping frequency of said transmitter-distributor, means operative in the presence of received teletypewriter signal start pulses to synchronize said wave with said start pulses, and means operative in the absence of received teletypewriter signal start pulses for stepping said receive cryptographic unit in synchronism with said wave.

4. Apparatus as claimed in claim 3 in which means operative immediately upon cessation of transmitter-distributor unit operation are provided to apply artificial start pulses to said outgoing transmission circuit, and in which means operative a predetermined length of time after cessation of transmitter-distributor operation are provided to disable said transmit cryptographic unit.

5. A cryptographic teletypewriter station adapted to send and receive enciphered teletypewriter signals in cooperation with a distant similar station connected thereto by a suitable bidirectional transmission link, said station comprising a transmitter-distributor unit for generating in each cycle of operation thereof a teletypewriter character group signal consisting of a start pulse, a plurality of intelligence pulses and a stop pulse occurring in succession, a transmit cryptographic unit, a receive cryptographic unit, said cryptographic units being of the on-line synchronous type, a recorder and a frequency standard producing a low frequency equal to the character group frequency of the teletypewriter signal and a high frequency that is a multiple of said low frequency, means for stepping said transmitter-distributor unit and said transmit cryptographic unit in synchronism once for each cycle of said low frequency, means for applying the output signal of said transmitter-distributor to said transmit cryptographic unit, means for applying the enciphered output signal of said transmit cryptographic unit to an outgoing transmission circuit, means for applying a received enciphered teletypewriter signal to the input of said receive cryptographic unit, means for applying the deciphered output signal of said receive cryptographic unit to said recorder, means for deriving from said high frequency a second low frequency equal to the first mentioned low frequency, means operative in the presence of received teletypewriter signal start pulses for stepping said receive cryptographic unit in synchronism with said start pulses, means operative in the presence of received teletypewriter signal start pulses to synchronize said second low frequency with said start pulses, and means operative in the absence of received teletypewriter signal start pulses for stepping said receive cryptographic unit in synchronism with said second low frequency.

6. Apparatus as claimed in claim 5 in which said high frequency is an even multiple of said low frequency, in which said means for deriving said second low frequency comprises a plurality of cascaded binary frequency dividers and in which said means for synchronizing said second low frequency with said start pulses comprises means for pre-setting said binary dividers during a short interval of time that ends substantially at the instant the leading edge of the next start pulse is due and for restoring said dividers to a normal operative condition at the end of said interval.

7. Apparatus as claimed in claim 6 in which means operative immediately upon cessation of transmitter-distributor operation are provided to apply artificial start pulses to said outgoing transmission circuit, and in which means operative a predetermined length of time after cessation of transmitter-distributor operation are provided to disable said transmit cryptographic unit.

References Cited in the file of this patent

UNITED STATES PATENTS

| Number | Name | Date |
|---|---|---|
| 2,401,855 | Briggs, et al. | June 11, 1946 |
| 2,456,733 | Potts | Dec. 21, 1948 |
| 2,543,199 | Potts | Feb. 27, 1951 |
| 2,572,685 | Watson | Oct. 23, 1951 |